(12) United States Patent
Chen et al.

(10) Patent No.: US 11,165,601 B2
(45) Date of Patent: Nov. 2, 2021

(54) METHOD, DEVICE AND COMPUTER PROGRAM PRODUCT FOR MANAGING NODES IN A NETWORK

(71) Applicant: EMC IP Holding Company LLC, Hopkinton, MA (US)

(72) Inventors: Si Chen, Shanghai (CN); Pengfei Wu, Shanghai (CN); Zhenzhen Lin, Shanghai (CN); Ruixue Zhang, Shanghai (CN)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

(21) Appl. No.: 16/838,191

(22) Filed: Apr. 2, 2020

(65) Prior Publication Data
US 2021/0218597 A1    Jul. 15, 2021

(30) Foreign Application Priority Data
Jan. 15, 2020    (CN) .......................... 202010042387.2

(51) Int. Cl.
*H04L 12/66* (2006.01)
*H04L 12/427* (2006.01)
*H04L 29/08* (2006.01)

(52) U.S. Cl.
CPC ............ *H04L 12/427* (2013.01); *H04L 67/12* (2013.01)

(58) Field of Classification Search
CPC ....... H04L 12/56; H04L 12/42; H04L 12/427; H04L 67/12
See application file for complete search history.

(56) References Cited

U.S. PATENT DOCUMENTS

| | | | | |
|---|---|---|---|---|
| 2004/0054807 A1* | 3/2004 | Harvey | ................. | H04L 67/104 709/243 |
| 2005/0036482 A1* | 2/2005 | Goroshevsky | .......... | H04L 12/42 370/352 |
| 2005/0237948 A1* | 10/2005 | Wan | ........................ | H04L 61/35 370/254 |
| 2006/0251062 A1* | 11/2006 | Jain | ........................ | H04L 45/02 370/389 |

(Continued)

OTHER PUBLICATIONS

P. Maymounkov et al., "Kademlia: A Peer-to-Peer Information System Based on the XOR Metric," Revised Papers from the First International Workshop on Peer-to-Peer Systems (ISTPS), Mar. 7-8, 2002, vol. 2429, pp. 53-65.

(Continued)

*Primary Examiner* — Abdelnabi O Musa
(74) *Attorney, Agent, or Firm* — Ryan, Mason & Lewis, LLP

(57) ABSTRACT

A method of managing nodes in a network is provided, comprising: in accordance with detecting that a new node joins a network including a plurality of nodes, mapping the new node to a virtual ring associated with the network, the plurality of nodes being mapped to different locations on the virtual ring; determining a decision region of the virtual ring, the decision region comprising the new node and at least one of the plurality of nodes, all of nodes in the decision region to jointly review a proposal of one of the nodes in the decision region; and adjusting nodes in the decision region other than the new node to locations on the virtual ring outside the decision region.

20 Claims, 7 Drawing Sheets

(56) References Cited

U.S. PATENT DOCUMENTS

2008/0107122 A1\* 5/2008 Lai ...................... H04L 67/1055
370/401
2014/0351419 A1\* 11/2014 Hunt ...................... H04L 43/08
709/224
2020/0204373 A1\* 6/2020 Lu ......................... H04L 63/068

OTHER PUBLICATIONS

B. Awerbuch et al., "Towards a Scalable and Robust DHT," Theory of Computing Systems, 2009, vol. 45, No. 2, pp. 234-260.

\* cited by examiner

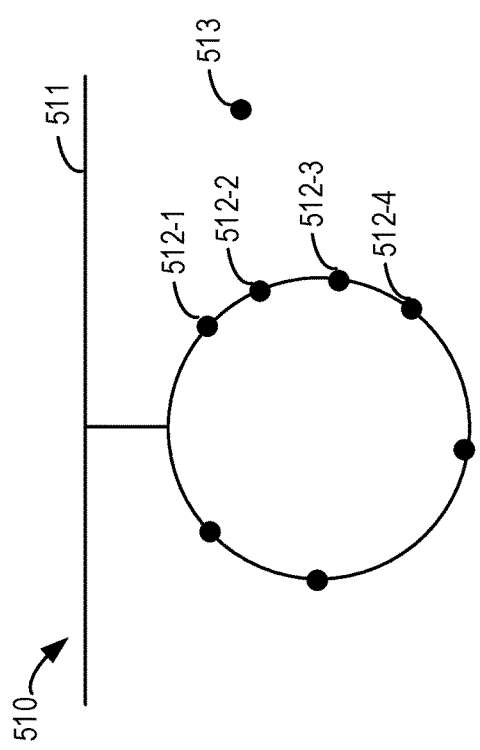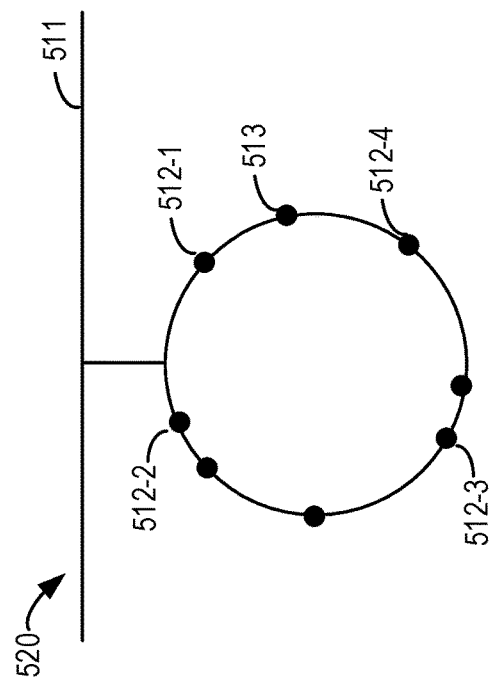

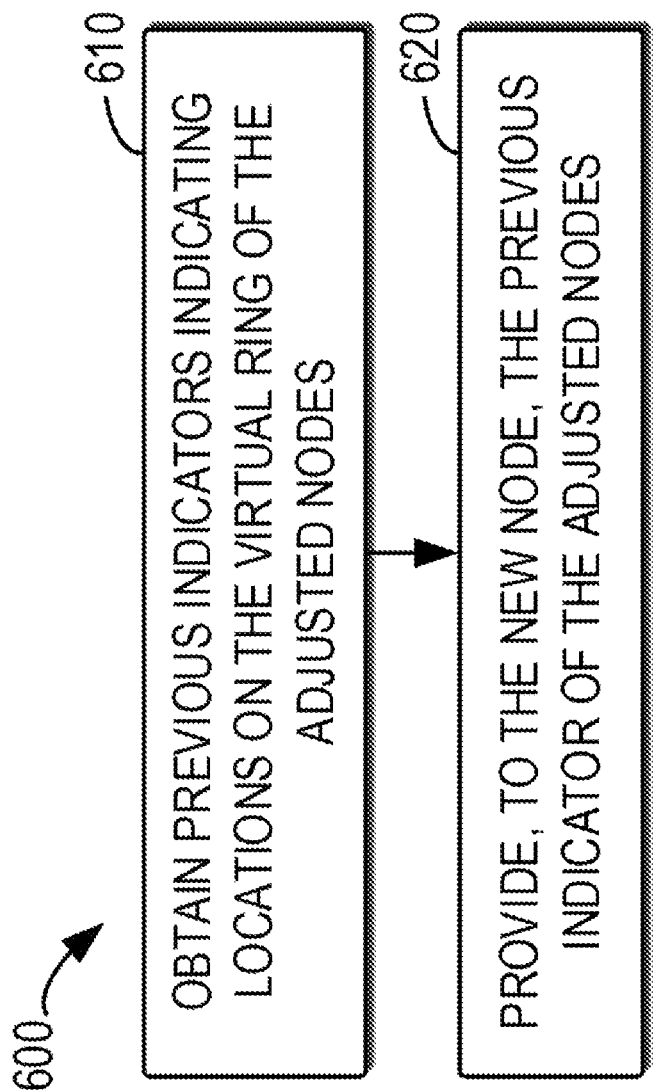

METHOD, DEVICE AND COMPUTER PROGRAM PRODUCT FOR MANAGING NODES IN A NETWORK

RELATED APPLICATION(S)

The present application claims priority to Chinese Patent Application No. 202010042387.2, filed Jan. 15, 2020, and entitled "Method, Device and Computer Program Product for Managing Nodes in a Network," which is incorporated by reference herein in its entirety.

FIELD

Embodiments of the present disclosure generally relate to the field of networks, and more specifically, to a method, device and computer program product for managing nodes in a network.

BACKGROUND

With rapid growth of smart devices and the high-speed development of networks, some new fields such as the Internet of Things (IoT) have been emerging. As a result, some new requirements are proposed to applicable network architectures in these emerging fields, such as high-throughput, scalability and security. However, conventional centralized networks suffer from concerns such as low-throughput and single point failures, etc., while decentralized networks have security concerns. Currently, there is no suitable network architecture to meet the requirements of emerging fields such as the IoT.

SUMMARY

Embodiments of the present disclosure provide a method, device and computer program product for managing nodes in a network.

In a first aspect of the present disclosure, there is provided a method of managing nodes in a network. The method comprises: in accordance with detecting that a new node joins a network including a plurality of nodes, mapping the new node to a virtual ring associated with the network, the plurality of nodes being mapped to different locations on the virtual ring; determining a decision region of the virtual ring, the decision region comprising the new node and at least one of the plurality of nodes, all of nodes in the decision region to jointly review a proposal of one of the nodes in the decision region; and adjusting nodes in the decision region other than the new node to locations on the virtual ring outside the decision region.

In a second aspect of the present disclosure, there is provided an electronic device. The electronic device comprises at least one processing unit and at least one memory coupled to the at least one processing unit and stores instructions for execution by the at least one processing unit. The instructions, when executed by the at least one processing unit, cause the electronic device to perform acts, the acts comprising: in accordance with detecting that a new node joins a network including a plurality of nodes, mapping the new node to a virtual ring associated with the network, the plurality of nodes being mapped to different locations on the virtual ring; determining a decision region of the virtual ring, the decision region comprising the new node and at least one of the plurality of nodes, all of nodes in the decision region to jointly review a proposal of one of the nodes in the decision region; and adjusting nodes in the decision region other than the new node to locations on the virtual ring outside the decision region.

In a third aspect of the present disclosure, there is provided a computer program product tangibly stored on a non-transitory computer-readable medium and comprising machine executable instructions that, when executed by a device, cause the device to perform the method according to the first aspect of the present disclosure.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following detailed description with reference to the accompanying drawings, the above and other objectives, features, and advantages of example embodiments of the present disclosure will become more apparent. In the example embodiments of the present disclosure, the same reference numerals usually refer to the same components.

FIG. 5A illustrates a schematic diagram of locations of nodes in a network before a new node joins the network according to embodiments of the present disclosure;

FIG. 5B illustrates a schematic diagram of locations of nodes in a network after a new node joins the network according to embodiments of the present disclosure;

FIG. 6 illustrates a flowchart of an example method of managing nodes in a network according to embodiments of the present disclosure.

In the various figures, the same or corresponding reference numerals indicate the same or corresponding parts.

DETAILED DESCRIPTION

Illustrative embodiments of the present disclosure will be described in more detail below with reference to the drawings. Although the drawings illustrate illustrative embodiments of the present disclosure, it should be appreciated that the present disclosure can be implemented in various manners and should not be limited to the embodiments explained herein. On the contrary, the embodiments are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example embodiment" and "one embodiment" are to be read as "at least one example embodiment." The term "a further embodiment" is to be read as "at least a further embodiment."

The terms "first," "second" and so on can refer to same or different objects. The following text also can include other explicit and implicit definitions.

Figure 1:
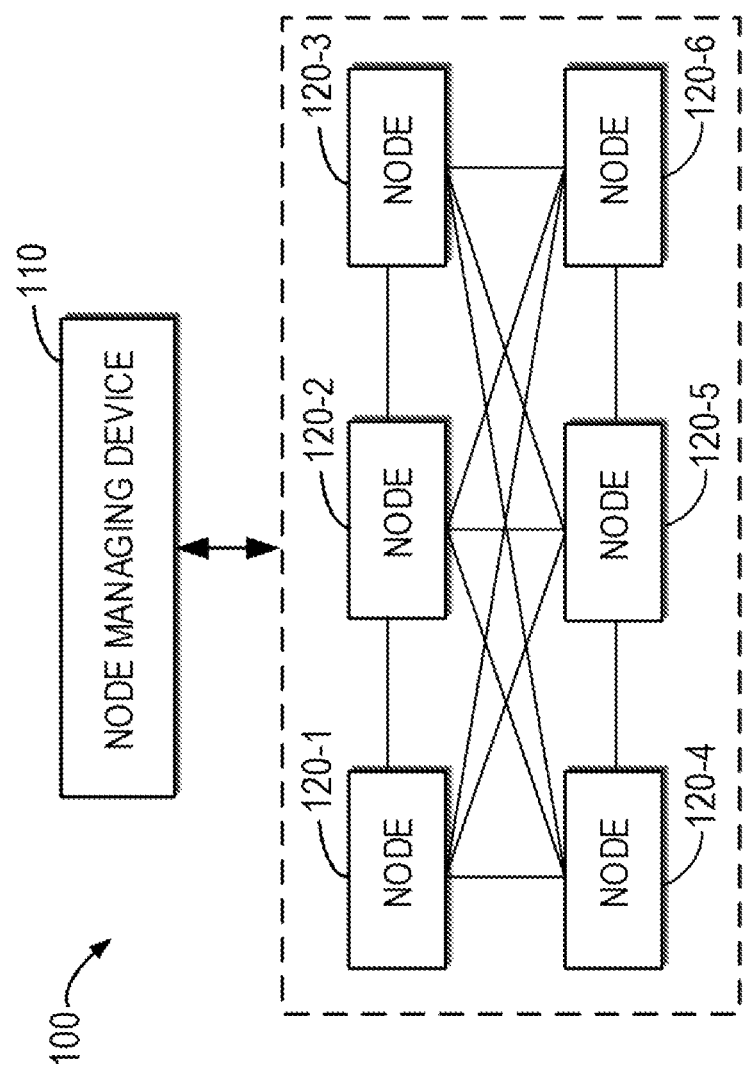
FIG. 1 illustrates a schematic diagram of an example node managing system in which embodiments of the present disclosure can be implemented.

FIG. 1 illustrates a schematic diagram of an example node managing system 100 in which embodiments of the present disclosure can be implemented. As shown in FIG. 1, the node managing system 100 includes a node managing device 110 and nodes 120-1 to 120-6 (collectively referred to as nodes 120). Various methods according to embodiments of the present disclosure may be implemented at the node managing device 110.

In order to better understand the motivation of the present invention, before describing FIG. 1 in detail, two conventional node managing systems are described with reference to FIG. 2 and FIG. 3.

Figure 2:
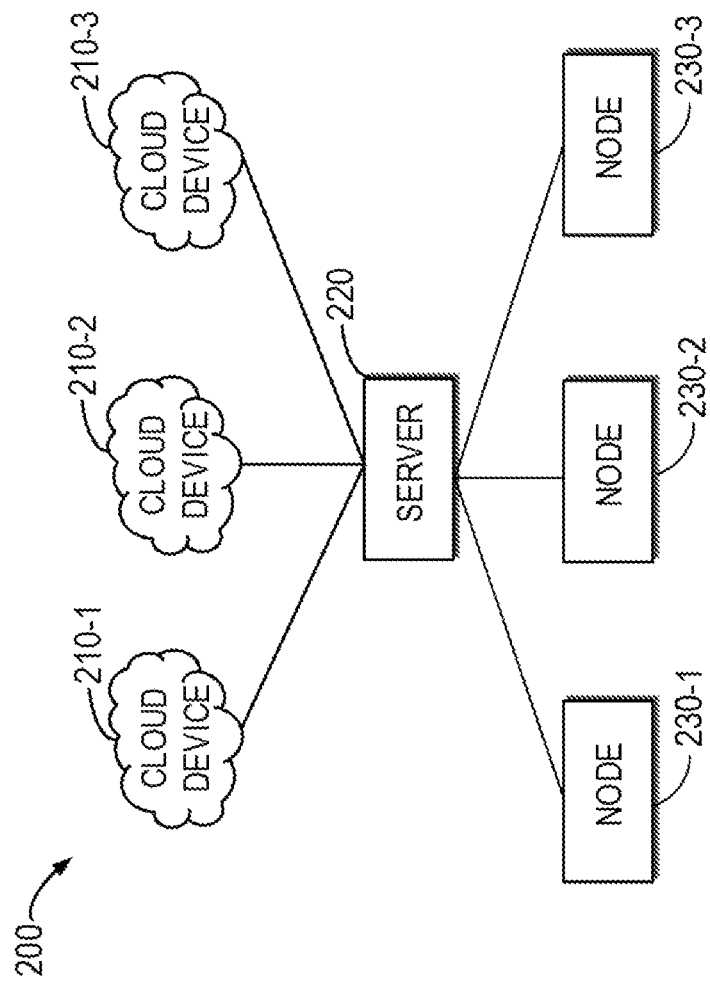
FIG. 2 illustrates a schematic diagram of a centralized node managing system in a conventional solution.

FIG. 2 illustrates a schematic diagram of a centralized node managing system 200 in a conventional solution. As shown in FIG. 2, the centralized node managing system 200 includes a server 220 and nodes 230-1 to 230-3 (collectively referred to as nodes 230). All data transmissions for storing and retrieving data are processed centrally by the server 220. Data are distributed to various cloud devices 210-1 to 210-3 (collectively referred to as cloud devices 210), and metadata containing location information can be stored in a centralized permanent component (not shown).

However, such a centralized solution suffers from many common issues, such as low throughput, single point failure, complicated environment structure, difficult to scale, etc.

In a centralized node managing system, the component with the least throughput will be the bottleneck of overall throughput. For the application scenario of a large amount of concurrent data transmission between nodes 230 and the server 220, the issue of low throughput will be magnified. Although solutions such as Geo-replication are widely adopted in a centralized node managing system, the low throughput issue is still not sufficiently overcome. Furthermore, such a solution raises numerous consequences such as data inconsistency, high storage cost, etc.

In addition, almost all centralized node managing systems suffer from the issue of single point of failure. Since all nodes communicate with a single application programming interface (API) endpoint, all data are pushed to or retrieved from heterogeneous cloud devices through a single API handler, failure of any component from the server side will cause downtime of the entire framework. Therefore, to guarantee a qualified service level of agreement (SLA), replication, redundant or lots of other approaches may be applied to such a centralized node managing system. However, the consequence is that the server cluster becomes more and more complex and difficult to maintain.

Moreover, in emerging application scenarios such as IoTs, nodes can be hacked even with a centralized server. Unlike a conventional centralized node managing system, in emerging application cases, nodes are not within a datacenter and are not managed by an administrator. They are running externally without a firewall. Although nodes are authorized by a centralized server with mechanisms such as public key infrastructure (PKI), they still can be hijacked outside in, and then perform any anomalous operations.

In view of the above, for the application scenario where a large amount of data transmission needs to be processed, a centralized node managing system is not applicable.

Figure 3:
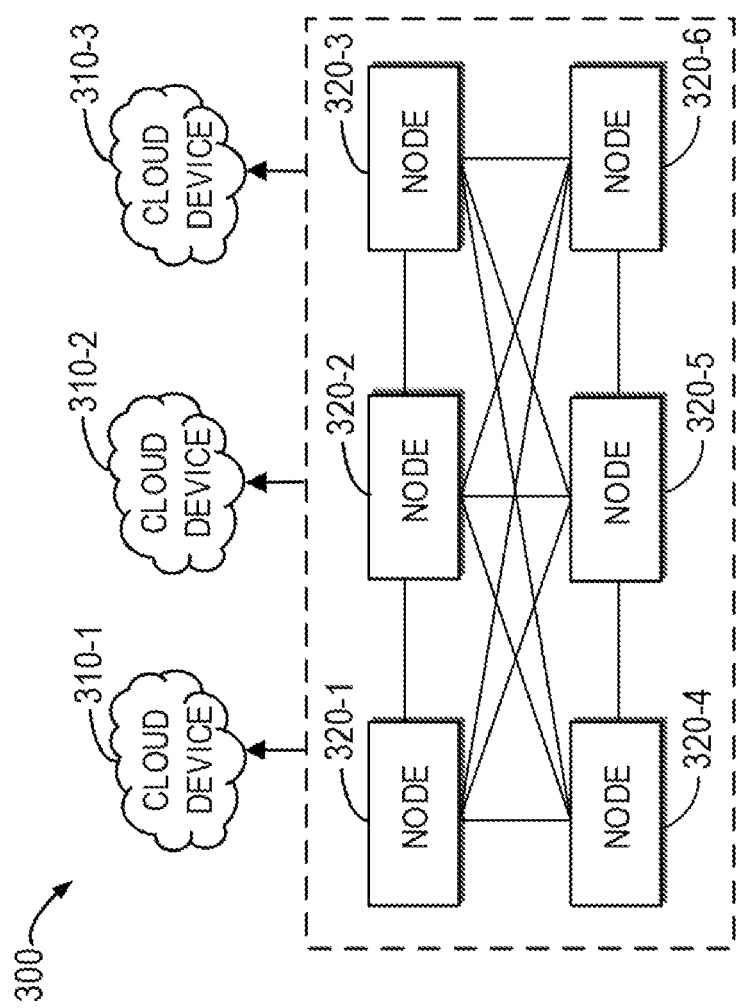
FIG. 3 illustrates a schematic diagram of a decentralized node managing system in a conventional solution.

FIG. 3 illustrates a schematic diagram of a decentralized node managing system 300 in a conventional solution. As shown in FIG. 3, the decentralized node managing system 300 includes nodes 320-1 to 320-6 (collectively referred to as nodes 320). All the communication and data transmission among nodes 320 (also known as peer devices) are totally self-verifiable and autonomous, and nodes 320 directly communicate with cloud devices 310-1 to 310-3 (collectively referred to as cloud devices 310) instead of storing and retrieving data via a server like a centralized node managing system.

Generally, any legal device can join the decentralized network formed by the nodes 320 and be discovered according to some distribution algorithm, such as consistent hashing. However, such a solution suffers from security issues. Since there is no centralized server, proposals from nodes cannot be verified in a centralized manner. Meanwhile, since there is no way to know whether a node in a decentralized network is malicious or hijacked, a single node cannot be simply trusted. When a node receives a proposal from another node, it cannot be determined whether to trust the proposer or whether to approve the proposal.

A possible solution to such a security problem is to form a small decision committee of nodes. A decision is made into a proposal by using a group of nodes in the decision committee, instead of a single node. In some decentralized applications, such as Bitcoin or Ethereum, to conclude an instruction or transaction, the proposal must obtain agreements from more than half of the nodes in the decision committee.

However, if a batch of malicious nodes joins the same decision committee, and the number of these malicious nodes exceeds half of the total number of nodes in this decision committee, any malicious commands or instructions can easily achieve agreements and be concluded. In this situation, security of a decision cannot be guaranteed.

Embodiments of the present disclosure propose a solution of managing nodes in a network to solve one or more of the above problems and other potential problems. This solution improves the security of a decision by managing locations of nodes in the network to keep the decision committee dynamic, while the communication and data transmission among the nodes still remains autonomous.

Embodiments of the present disclosure will now be further described in conjunction with FIG. 1. In the example node managing system 100 in which embodiments of the present disclosure can be implemented, the node managing device 110 is a device that manages locations of nodes in a network on a virtual ring corresponding to the network. The node managing device 110 may be, for example, a computer, a virtual machine, a server, or the like. In an embodiment, the node managing device 110 may be an edge server. The node 120 may be any device that can join the network and communicate with each other. According to different application scenarios, the node 120 may be a car, a home electronic device, a computer, a smart phone connected to each other. The present disclosure is not limited in this regard. The node managing devices 110 and the node 120 communicate with each other through a network, which may be, for example, the Internet.

It should be understood that the structure of the node managing system 100 is described for exemplary purposes only, and does not imply any limitation on the scope of the present disclosure. For example, embodiments of the present disclosure can also be applied to a system different from the node managing system 100. It should be understood that the specific number of devices described above is given for illustrative purposes only and does not imply any limitation on the scope of the disclosure. For example, embodiments of the present disclosure may also be applied to more or fewer devices.

Figure 4:
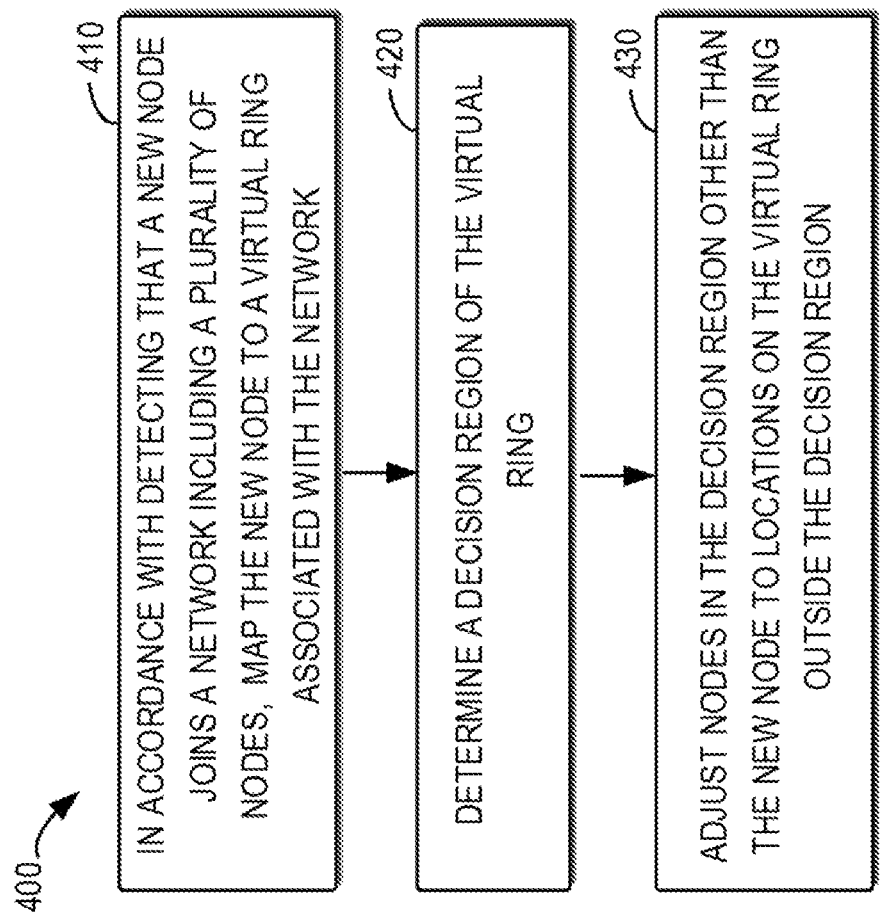
FIG. 4 illustrates a flowchart of an example method of managing nodes in a network according to embodiments of the present disclosure.

Embodiments of the present disclosure are further described below through a flowchart of an example method 400 of managing nodes in a network shown in FIG. 4. The method 400 may be performed, for example, by the node managing device 110 shown in FIG. 1. It should be understood that the method 400 may also be performed by other devices, and the scope of the present disclosure is not limited in this regard. It should also be understood that the method 400 may include additional acts not shown and/or omit the acts shown, and the scope of the present disclosure is not limited in this regard.

At 410, in accordance with detecting that a new node joins a network including a plurality of nodes, the node managing device 110 maps the new node to a virtual ring associated with the network.

In some embodiments, the network may be a decentralized network, and the virtual ring may be a hash ring, which maps the plurality of nodes in the network to different locations on the virtual ring through an algorithm such as consistent hashing. When the node managing device 110 detects that a new node joins the network, it determines a location on the virtual ring for the new node, and provides, to the new node, an indicator which indicates the location determined for the new node.

At 420, the node managing device 110 determines a decision region of the virtual ring.

In some embodiments, the node managing device 110 may determine a predetermined number of neighboring nodes as a decision region (also referred to as a k region), and all of nodes in each decision region will jointly review a proposal of one of the nodes in the decision region. Additionally, in some embodiments, the nodes within the decision region determine whether to approve the node's proposal by reviewing the indicator and/or certificate of the node that made the proposal. Alternatively, in other embodiments, the node managing device 110 may divide the virtual ring into a predetermined number of regions, for example, divide the virtual ring into 2 regions with a size of ½r for each region, where r is a positive integer and each region starts at an integer multiple of ½r. Assume that x ∈[0, 1] is used to represent the new node, and n is the total number of nodes on the ring, then the k region is a region of size k/n, and the k region $R_k(x)$ is the unique k region containing x.

Therefore, after the node managing device 110 maps the new node to the virtual ring, the node managing device 110 may determine a decision region containing the new node and the decision region includes the new node and at least one of the plurality of nodes.

In some embodiments, the node managing device 110 may determine a closest set of indicators to the indicator of the new node through an indicator indicating the location of the new node on the virtual ring and indicators indicating the locations of the plurality of nodes on the virtual ring, and determines the nodes corresponding to this set of indicators as a set of neighboring nodes of the new node. Then, the decision region is determined based on the locations on the virtual ring of the new node and the set of neighboring nodes.

Additionally or alternatively, in other embodiments, the node managing device 110 may determine a set of neighboring nodes in accordance with receiving information from the new node about the set of neighboring nodes. Specifically, the new node can initiate a routing request to random nodes in the network, making these random nodes in the network route to itself, for example, according to the Kademlia DHT algorithm. Then the new node can determine some nodes whose indicators are closest to its indicator via the last hops in the routing path. Regarding the Kademlia DHT algorithm, see, for example, P. Maymounkov and D. Mazieres, "Kademlia: A Peer-to-Peer Information System Based on the XOR Metric," in International Workshop on Peer-to-Peer Systems, 2002, pp. 53-65. Then, the new node may check whether the indicators of these nodes are in the decision region including the new node (the node managing device 110 may predefine the indicator intervals in the decision region), thereby determining a set of neighboring nodes. After the new node determines a set of neighboring nodes, it can send the indicators of the set of neighboring nodes to the node managing device 110.

Additionally, in still other embodiments, in order to increase security, the node managing device 110 may also periodically initiate a neighbor node lookup process to confirm whether the indicators of the neighboring nodes provided by the new node are correct.

At 430, the node managing device 110 adjusts nodes in the decision region other than the new node to locations on the virtual ring outside the decision region.

In some embodiments, in order to prevent neighboring nodes from forming a malicious decision region and thus causing a security problem, whenever a new node joins, the node managing device 110 adjusts other nodes in the decision region including the new node to be outside the decision region.

The following describes 430 with reference to FIGS. 5A and 5B.

FIG. 5A illustrates a schematic diagram 510 of locations of nodes in a network before a new nodes joins the network according to embodiments of the present disclosure.

As shown in FIG. 5A, 511 represents the node managing device 110, the ring represents the virtual ring associated with the network, and solid circles on the ring represent nodes mapped to the ring. Before the new node 513 joins the network, nodes 512-1 to 512-4 are neighboring nodes. If the node managing device 110 determines that three neighboring nodes form a decision region, the nodes 512-1 to 512-3 may form a decision region before the new node 513 joins the network.

FIG. 5B illustrates a schematic diagram 520 of locations of nodes in a network after a new node joins the network according to embodiments of the present disclosure.

As shown in FIG. 5B, after the new node 513 joins the network, the node managing device 110 maps the new node to the location between the nodes 512-2 and 512-3. Since the decision region is determined to be three neighboring nodes, the nodes 512-2, 513, and 512-3 would originally form a decision region. At this time, the node managing device 110 adjusts the nodes 512-2 and 512-3 to locations outside the decision region, so that the nodes 512-2, 513 and 512-3 no longer form a decision region.

Additionally, in some embodiments, the node managing device 110 may determine evenly distributed locations, not overlapped with any node on the ring, far from the new node, outside the decision region on the virtual ring, and then the node managing device 110 may provide the adjusted nodes 512-2 and 512-3 with indicators indicating the determined locations, and adjust them to the determined locations so that the adjusted nodes 512-2 and 512-3 are away from each other, thereby eliminating the possibility of malicious nodes approaching each other and forming a decision committee.

Additionally, in some embodiments, the node managing device 110 may determine the locations of the adjusted nodes outside the decision region by using a cuckoo algorithm. Regarding the cuckoo algorithm, see, for example, B. Awerbuch and C. Scheideler, "Towards a Scalable and Robust DHT," Theory of Computing Systems, vol. 45, no. 2, pp. 234-260, 2009.

It should be understood that FIGS. 5A and 5B are shown for exemplary purposes only, and do not imply any limitation on the scope of the present disclosure. For example, there may be more or fewer nodes on the virtual ring; the nodes on the virtual ring may be on other locations; and/or other number of neighboring nodes may be used as a decision region. The present disclosure is not limited in these respects.

In the above exemplary embodiments, by adjusting nodes other than the new node in the decision region to locations outside the decision region when a new node joins the network, the decision committee of nodes in the network can be kept dynamic, a set of potential malicious nodes can be prevented from forming a committee that can make decisions or a node can be avoided from being hijacked due to its fixed location, thereby improving the decision security of the network.

Furthermore, in the above exemplary embodiments, since the node managing device is responsible for managing the locations and authentications of the nodes, the communication and data transmission among the nodes is still fully self-verifiable and autonomous. That is, control and data planes are decoupled. Therefore, problems such as low throughput and single point failure in a centralized node managing system do not occur, and hash calculations related to the location management of the nodes are handled by the node managing device, without considering whether the nodes have computation resources or not.

FIG. 6 illustrates a flowchart of an example method 600 of managing nodes in a network according to embodiments of the present disclosure. The acts shown in method 600 may be additionally performed after method 400. For example, the method 600 may be performed by the node managing device 110 as shown in FIG. 1. It should be understood that the method 600 may also be performed by other devices, and the scope of the present disclosure is not limited in this regard. It should also be understood that the method 600 may further include additional acts not shown and/or may omit acts shown, and the scope of the present disclosure is not limited in this regard.

At 610, the node managing device 110 obtains previous indicators indicating locations on the virtual ring of the adjusted nodes.

In some embodiments, since a decentralized network is still formed among the nodes 120, the nodes are self-organized. Therefore, although the node managing device 110 may provide the adjusted nodes, for example, nodes 512-2 and 512-3 in FIG. 5B, with new indicators and new certificates for proposals, and may adjust them to other locations on the virtual ring, the adjusted nodes still have the previous indicators and previous certificates. If the adjusted nodes are malicious or hijacked, they can still make malicious proposals to the nodes in the previous decision region by using the previous indicators and previous credentials. The node managing device 110 can therefore obtain previous indicators of these adjusted nodes.

Then, at 620, the node managing device 110 provides, to the new node, the previous indicator of the adjusted nodes.

In some embodiments, after the new node joins the network, the node managing device 110 may provide a certificate for proposal to the new node based on PKI mechanism. The certificate may include a validity time of the certificate, a signature for the certificate, and an expiration time of the certificate, etc. In addition, the node managing device 110 may also provide the new node with previous indicators of the adjusted nodes to indicate that the locations of these adjusted nodes have been adjusted, and that the previous certificates they possess have been revoked. In this way, any proposal from the adjusted nodes that utilizes the previous indicators will be rejected by the new node, thereby preventing the adjusted nodes from making a malicious proposal to the previous decision region.

Additionally, in other embodiments, the node managing device 110 may also periodically update the indicators and certificates provided to the nodes on the network to make the nodes further dynamic.

In the above exemplary embodiments, by providing the previous indicators of the adjusted nodes to the new node, it can be further ensured that the adjusted nodes cannot use the previous indicators and certificates to make malicious proposals, thereby further improving decision security of the network.

Embodiments of the present disclosure can be applied to various scenarios. Some exemplary application scenarios to which the embodiments of the present disclosure are applicable are described.

In an application scenario of connected cars which require high security guarantee, instructions should be verified by a decision committee of nodes. For example, instructions regarding whether a region is full, whether a new car is suggested to drive on a route and join this region, etc. should be verified. According to embodiments of the present disclosure, in a decision committee with K cars, only one car from one committee can join the decision committee at one time. Assuming this is a malicious car, there are still K-1 (more than half of the total number of cars in the decision committee) cars can detect any anomaly from this malicious car. In conventional centralized node managing systems, indicators of nodes are fixed, and therefore can be hacked easily. With the present disclosure, the node managing device can dynamically adjust locations of nodes to avoid this problem. Therefore, the present disclosure is applicable to the application scenario where cars frequently join and leave.

Additionally, in an application scenario of a decentralized object storage, to achieve high throughput for object storage, a decentralized object storage system is usually used. Since data are replicated on nearby nodes, for the sake of information security, any commands including adding and removing data or other decisions should be approved by a group of nodes or a decision committee rather than a single node. In the decentralized system without employing the present disclosure, malicious nodes can jointly continuously propose any deletion proposal to hack the data protection system. However, with the present disclosure, malicious nodes are distributed into different decision committees. Each proposal can be securely verified and figured out.

Advantageously, with embodiments of the present disclosure, the decision committee of nodes in the network can be kept dynamic, and a set of potential malicious nodes can be prevented from forming a committee that can make decisions, thereby improving the decision security of the network.

Figure 7:
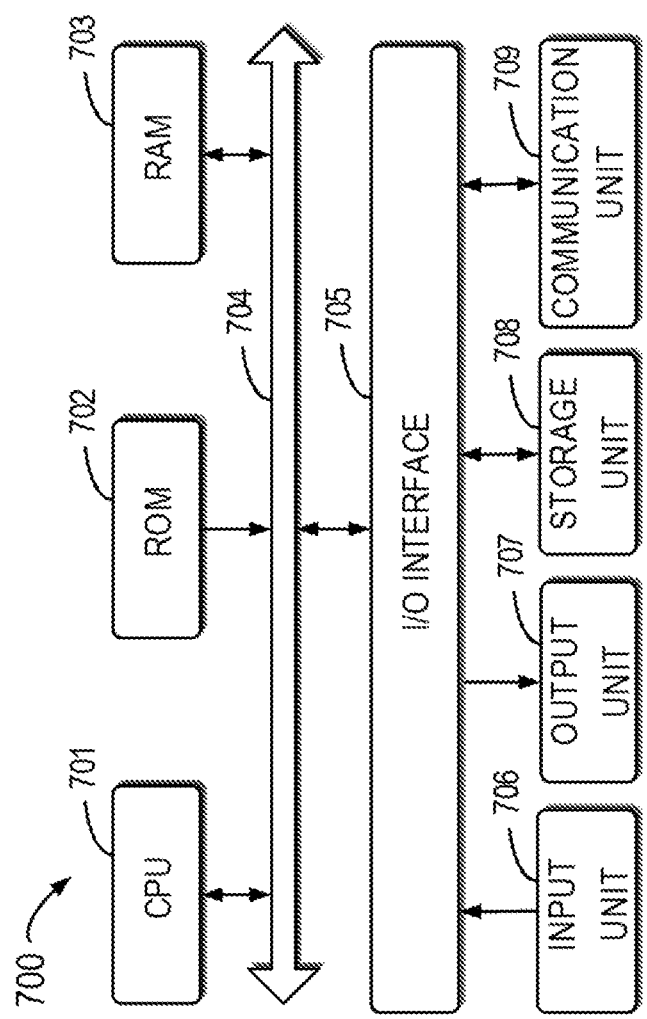
FIG. 7 illustrates a schematic block diagram of an electronic device for implementing embodiments of the present disclosure.

FIG. 7 illustrates a schematic block diagram of an example electronic device 700 for implementing embodiments of the present disclosure. For example, the node managing device 110 shown in FIG. 1 can be implemented by the electronic device 700. As shown, the electronic device 700 includes a central processing unit (CPU) 701, which can execute various suitable acts and processing based on the computer program instructions stored in the read-only memory (ROM) 702 or computer program instructions loaded in the random-access memory (RAM) 703 from a storage unit 708. The RAM 703 can also store all kinds of programs and data required by the operations of the device 700. CPU 701, ROM 702 and RAM 703 are connected to each other via a bus 704. The input/output (I/O) interface 705 is also connected to the bus 704.

A plurality of components in the electronic device 700 is connected to the I/O interface 705, including: an input unit 706, such as keyboard, mouse and the like; an output unit 707, e.g., various kinds of display and loudspeakers etc.; a storage unit 708, such as magnetic disk and optical disk etc.; and a communication unit 709, such as network card, modem, wireless transceiver and the like. The communication unit 709 allows the electronic device 700 to exchange information/data with other devices via the computer network, such as Internet, and/or various telecommunication networks.

The various methods and processes described above, such as the methods 400 and 600, can be executed by the processing unit 701. For example, in some embodiments, the methods 400 and 600 can be implemented as a computer software program tangibly included in the machine-readable medium, e.g., storage unit 708. In some embodiments, the computer program can be partially or fully loaded and/or mounted to the electronic device 700 via ROM 702 and/or communication unit 709. When the computer program is loaded to RAM 703 and executed by the CPU 701, one or more steps of the above described methods 400 and 600 can be implemented.

The present disclosure can be a method, apparatus, system and/or computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but not limited to, such as electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched cards stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combination of one or more programming languages, wherein the programming languages consist of object-oriented programming languages, e.g., Smalltalk, C++ and so on, and conventional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where a remote computer is involved, the remote computer can be connected to the user computer via any type of network, including local area network (LAN) and wide area network (WAN), or to the external computer (e.g., connected via Internet using the Internet service provider). In some embodiments, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to a flow chart and/or block diagram of method, apparatus (system) and computer program products according to embodiments of the present disclosure. It should be understood that each block of the flow chart and/or block diagram and the combination of various blocks in the flow chart and/or block diagram can be implemented by computer-readable program instructions.

The computer-readable program instructions can be provided to the processing unit of a general-purpose computer, dedicated computer or other programmable data processing apparatuses to manufacture a machine, such that the instructions that, when executed by the processing unit of the computer or other programmable data processing apparatuses, generate an apparatus for implementing functions/acts stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/acts stipulated in one or more blocks of the flow chart and/or block diagram.

The computer-readable program instructions can also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/acts stipulated in one or more blocks of the flow chart and/or block diagram.

The flow chart and block diagram in the drawings illustrate system architecture, functions and operations that may be implemented by system, method and computer program product according to multiple implementations of the present disclosure. In this regard, each block in the flow chart or block diagram can represent a module, a part of a program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or acts, or by a combination of dedicated hardware and computer instructions.

Various implementations of the present disclosure have been described above and the above description is only exemplary rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each implementation and technical improvements made in the market by each embodiment, or otherwise enables others of ordinary skill in the art to understand implementations of the present disclosure.

What is claimed is:

1. A method of managing nodes in a network, comprising:
   in accordance with detecting that a new node joins a network including a plurality of nodes, mapping the new node to a virtual ring associated with the network, the plurality of nodes being mapped to different locations on the virtual ring;
   determining a decision region of the virtual ring, the decision region comprising the new node and at least one of the plurality of nodes;
   adjusting one or more nodes of the plurality of nodes of the virtual ring originally in the decision region to locations on the virtual ring outside the decision region;
   jointly reviewing, by the nodes in the decision region, a proposal from one of the nodes in the decision region, to decide whether or not to approve the proposal;
   obtaining previous indicators indicating locations on the virtual ring of the adjusted nodes; and
   providing the previous indicators to the new node, such that the new node rejects proposals of the adjusted nodes using the previous indicators.

2. The method according to claim 1, wherein mapping the new node to the virtual ring comprises:
   determining a location on the virtual ring for the new node; and
   providing, to the new node, an indicator indicating the determined location.

3. The method of claim 1, wherein determining the decision region comprises:
   determining a set of neighboring nodes of the new node from the plurality of nodes; and
   determining the decision region based on locations on the virtual ring of the new node and the set of neighboring nodes.

4. The method of claim 3, wherein determining the set of neighboring nodes comprises any one of the following:
   determining the set of neighboring nodes, based on an indicator indicating the location on the virtual ring of the new node and indicators indicating the locations on the virtual ring of the plurality of nodes; and
   determining the set of neighboring nodes in accordance with receiving information from the new node about the set of neighboring nodes.

5. The method of claim 1, wherein the adjusting comprises:
   determining locations away from the new node other than the locations corresponding to the plurality of nodes, outside the decision region on the virtual ring; and
   providing, to the adjusted nodes, indicators indicating the determined locations.

6. The method according to claim 1, further comprising:
   providing, to the new node, at least one of a validity time of a certificate for proposal, a signature for the certificate, and an expiration time of the certificate.

7. The method of claim 1, wherein the network is a decentralized network.

8. An electronic device, comprising:
   at least one processing unit;
   at least one memory coupled to the at least one processing unit and storing instructions for execution by the at least one processing unit, the instructions, when executed by the at least one processing unit, causing the electronic device to perform acts, the acts comprising:
   in accordance with detecting that a new node joins a network including a plurality of nodes, mapping the new node to a virtual ring associated with the network, the plurality of nodes being mapped to different locations on the virtual ring;
   determining a decision region of the virtual ring, the decision region comprising the new node and at least one of the plurality of nodes;
   adjusting one or more nodes of the plurality of nodes of the virtual ring originally in the decision region to locations on the virtual ring outside the decision region;
   jointly reviewing, by the nodes in the decision region, a proposal from one of the nodes in the decision region, to decide whether or not to approve the proposal;
   obtaining previous indicators indicating locations on the virtual ring of the adjusted nodes; and
   providing the previous indicators to the new node, such that the new node rejects proposals of the adjusted nodes using the previous indicators.

9. The electronic device according to claim 8, wherein mapping the new node to the virtual ring comprises:
   determining a location on the virtual ring for the new node; and
   providing, to the new node, an indicator indicating the determined location.

10. The electronic device of claim 8, wherein determining the decision region comprises:
    determining a set of neighboring nodes of the new node from the plurality of nodes; and
    determining the decision region based on locations on the virtual ring of the new node and the set of neighboring nodes.

11. The electronic device of claim 10, wherein determining the set of neighboring nodes comprises any one of the following:
   determining the set of neighboring nodes, based on an indicator indicating the location on the virtual ring of the new node and indicators indicating the locations on the virtual ring of the plurality of nodes; and
   determining the set of neighboring nodes in accordance with receiving information from the new node about the set of neighboring nodes.

12. The electronic device of claim 8, wherein the adjusting comprises:
   determining locations away from the new node other than the locations corresponding to the plurality of nodes, outside the decision region on the virtual ring; and
   providing, to the adjusted nodes, indicators indicating the determined locations.

13. The electronic device according to claim 8, wherein the acts further comprise:
   providing, to the new node, at least one of a validity time of a certificate for proposal, a signature for the certificate, and an expiration time of the certificate.

14. The electronic device of claim 8, wherein the network is a decentralized network.

15. A computer program product tangibly stored on a non-transitory computer-readable medium and comprising machine-executable instructions that, when executed by a device, cause the device to perform steps comprising:
   in accordance with detecting that a new node joins a network including a plurality of nodes, mapping the new node to a virtual ring associated with the network, the plurality of nodes being mapped to different locations on the virtual ring;
   determining a decision region of the virtual ring, the decision region comprising the new node and at least one of the plurality of nodes;
   adjusting one or more nodes of the plurality of nodes of the virtual ring originally in the decision region to locations on the virtual ring outside the decision region;
   jointly reviewing, by the nodes in the decision region, a proposal from one of the nodes in the decision region to decide whether or not to approve the proposal;
   obtaining previous indicators indicating locations on the virtual ring of the adjusted nodes; and
   providing the previous indicators to the new node, such that the new node rejects proposals of the adjusted nodes using the previous indicators.

16. The computer program product according to claim 15, wherein mapping the new node to the virtual ring comprises:
   determining a location on the virtual ring for the new node; and
   providing, to the new node, an indicator indicating the determined location.

17. The computer program product according to claim 15, wherein determining the decision region comprises:
   determining a set of neighboring nodes of the new node from the plurality of nodes; and
   determining the decision region based on locations on the virtual ring of the new node and the set of neighboring nodes.

18. The computer program product according to claim 17, wherein determining the set of neighboring nodes comprises any one of the following:
   determining the set of neighboring nodes, based on an indicator indicating the location on the virtual ring of the new node and indicators indicating the locations on the virtual ring of the plurality of nodes; and
   determining the set of neighboring nodes in accordance with receiving information from the new node about the set of neighboring nodes.

19. The computer program product according to claim 15, wherein the adjusting comprises:
   determining locations away from the new node other than the locations corresponding to the plurality of nodes, outside the decision region on the virtual ring; and
   providing, to the adjusted nodes, indicators indicating the determined locations.

20. The computer program product according to claim 15, further comprising:
   providing, to the new node, at least one of a validity time of a certificate for proposal, a signature for the certificate, and an expiration time of the certificate.

* * * * *